Jan. 19, 1960 R. E. GOULD ET AL 2,921,355
METHOD AND MEANS FOR MOLDING
Filed Nov. 10, 1954 3 Sheets-Sheet 1
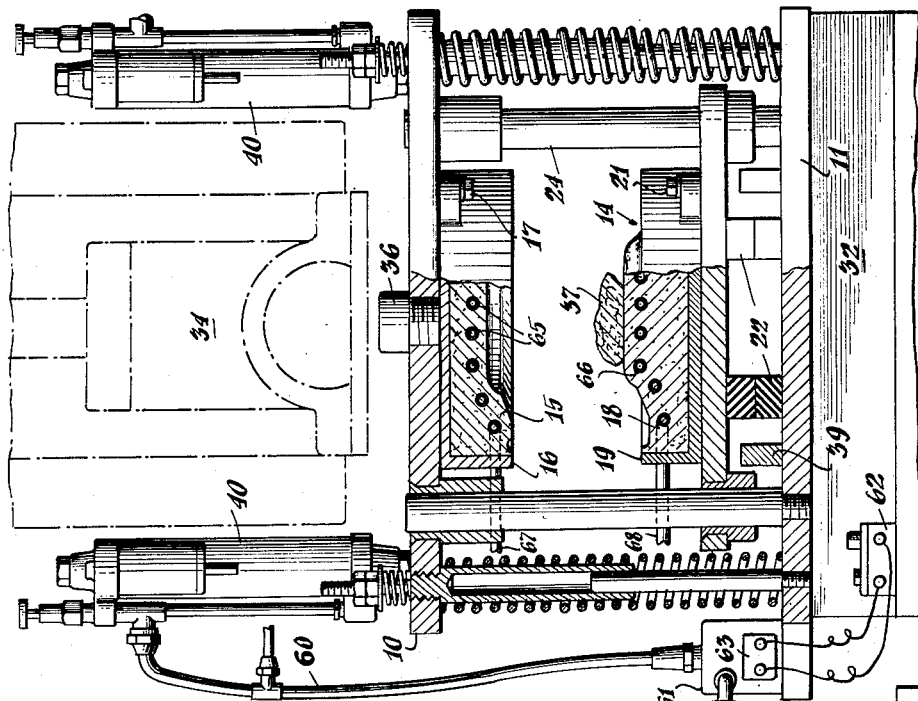
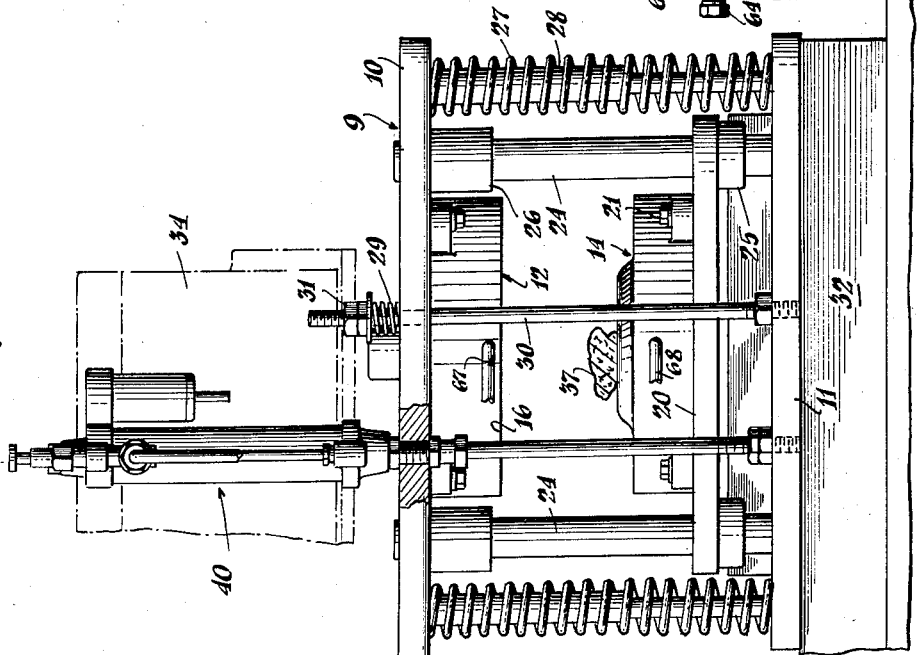
INVENTOR
ROBERT E. GOULD
WILLIAM E. COPE
BY
Norman R. Holland
ATTORNEY Jan. 19, 1960  R. E. GOULD ET AL  2,921,355
METHOD AND MEANS FOR MOLDING
Filed Nov. 10, 1954  3 Sheets-Sheet 2
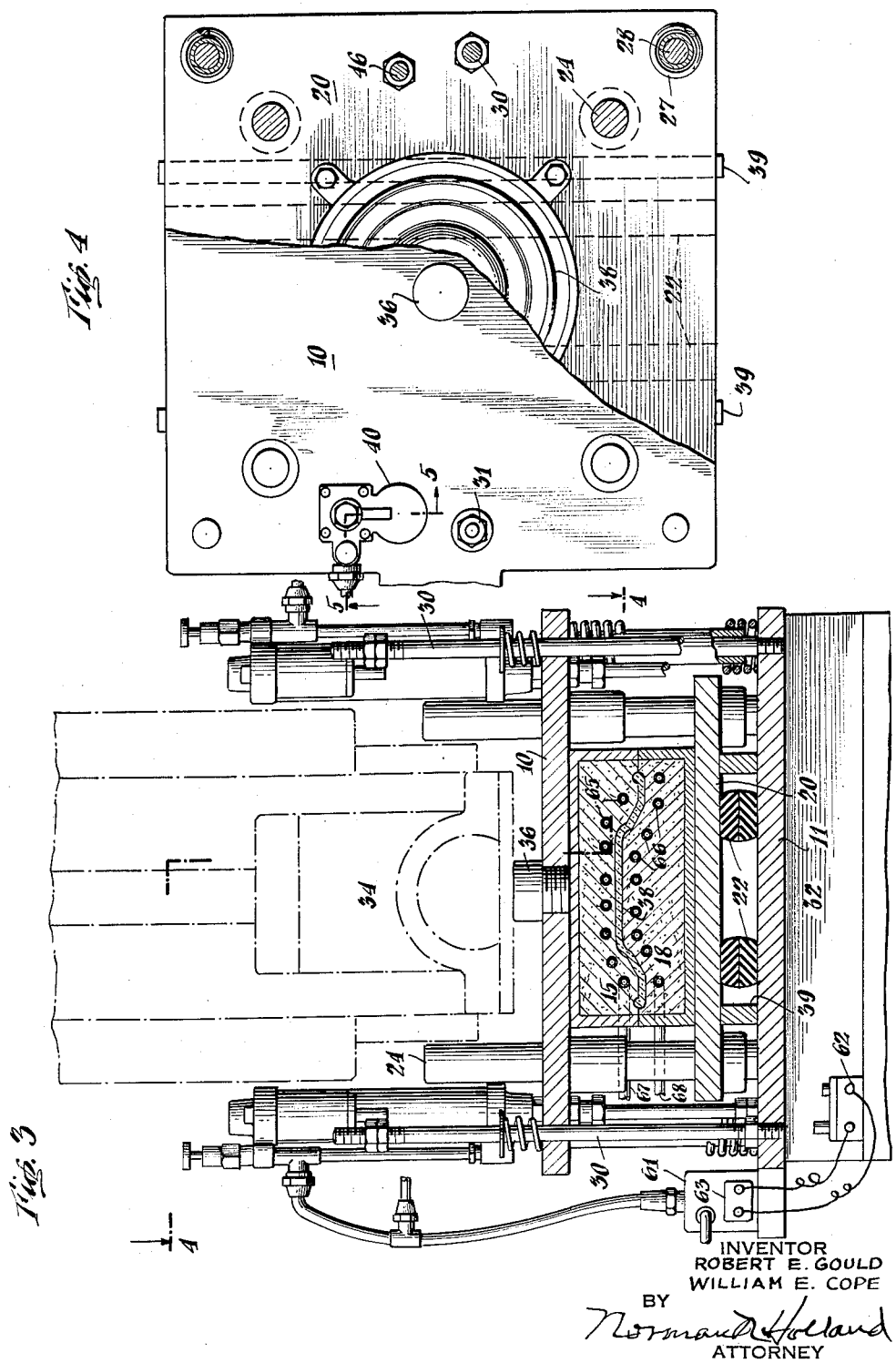
INVENTOR
ROBERT E. GOULD
WILLIAM E. COPE
BY
ATTORNEY

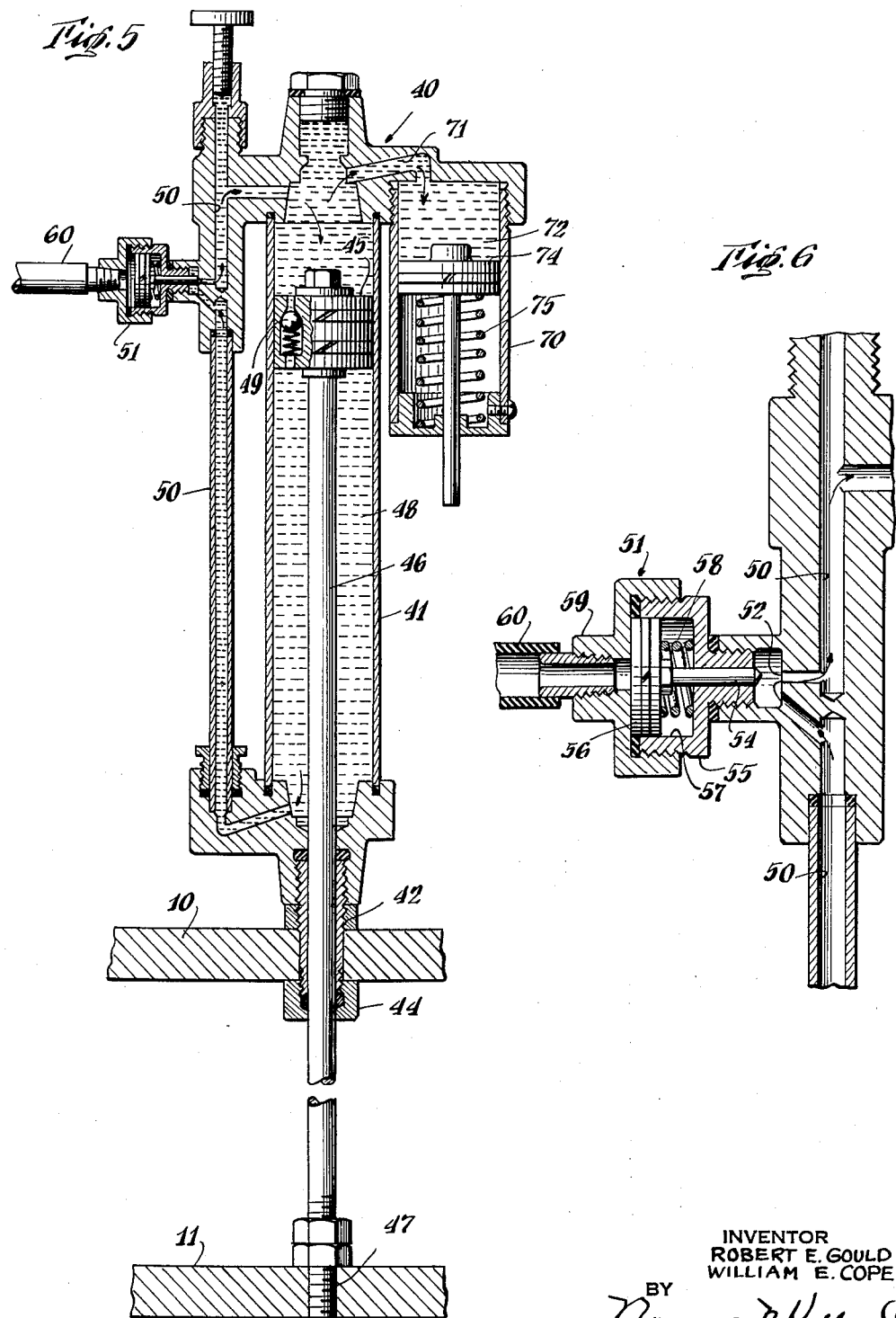

United States Patent Office 2,921,355
Patented Jan. 19, 1960

2,921,355

METHOD AND MEANS FOR MOLDING

Robert E. Gould, East Aurora, N.Y., and William E. Cope, Sebring, Ohio, assignors to Buffalo Pottery, Inc., Buffalo, N.Y., a corporation of New York Application November 10, 1954, Serial No. 468,076

7 Claims. (Cl. 25—129)

The present invention relates to a means for molding articles in a die set and more particularly to a means for maintaining a molded article under pressure in the dies after the dies have been removed from the press.

In making molded articles there are certain processes in common use in which it is desirable to keep the dies closed and under pressure for a specific period after initially bringing the dies together. One example of such a process is the Ram Process which is used for forming clay ware. In this process the dies are forced together in a press with clay molding material between them. The ware is formed as the clay is forced into the ware-shaped cavity between the dies. During this forcing of the clay into the cavity, shock waves or pressure ridges form in the clay. The dies are accordingly held closed and under pressure after the ware has been completely formed until the clay reaches a state of stress equilibrium and the shock waves or pressure ridges disappear.

The usual method of handling the dies in this Ram Process is to attach the upper and lower dies on the platens of a press and to close the press and keep it closed under pressure for the desired time. The present invention discloses a means by which the die set may be removed from the press immediately after closing. The die set is kept locked and under pressure by its own built-in locking and pressure retaining means. By allowing the die set to be removed from the press immediately after the closing and by thus eliminating the long holding period, the output of the presses may be stepped up several times.

An object of this invention is to provide an improved means for molding.

Another object of this invention is to provide a means for increasing the output of molding presses.

Another object of this invention is to provide a means whereby a die set may be removed from a press while being kept closed under pressure.

Another object of this invention is to provide a latching die set.

A further object of the invention is to provide a latching die set with a self-contained pressure maintaining means.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a front elevational view, partially cut away, of the molding means in its open position;

Fig. 2 is a side elevational view, partially cut away, of the molding means of Fig. 1;

Fig. 3 is a front elevational view in section showing the molding means of Fig. 1 in its closed position;

Fig. 4 is a sectional view taken along the line 4—4 of Fig. 3;

Fig. 5 is an enlarged detailed sectional view of the hydraulic lock of the molding means of Fig. 1; and Fig. 6 is an enlarged detailed view in section of the air valve of the hydraulic lock of Fig. 5.

A preferred embodiment of the molding means will first be described generaly with particular reference to Figs. 1 through 3. The molding means or die set 9 comprises an upper mounting plate 10 and a lower mounting plate 11 between which two cooperable dies 12 and 14 are mounted. Upper die 12 has an outer metal shell 16 and a body 15 formed of a suitable porous material which is usually plaster of Paris. The body 15 is porous and permeable so that it can absorb water and so that air may pass therethrough from porous conduit 65. The outer end 67 of conduit 65 is connected to a suitable source of air under pressure so that, when desired, air may be applied through conduit 65 to blow the formed ware off the body 15. Lower die 14 has a similar body 18 in a shell 19 and has an air conduit 66 adapted to be connected to a source of air through tube 68. Die 14 is floatingly mounted above lower plate 11 on a floating plate 20 by fastenings 21. Plate 20 is held above lower plate 11 by resilient rubber cushions 22. The upper and lower dies 12 and 14 are held in cooperating relationship by vertical guide posts 24. Posts 24 are fastened to lower plate 11 and pass through bearings 25 and 26 on plates 20 and 10, respectively, which allow plates 20 and 10 to slide vertically on posts 24. Upper plate 10 is held in a normally upward or open position by springs 27 compressed between plates 10 and 11 around telescoping corner posts 28. Spring 29 at the top of stop rod 30 limits the upward movement of plate 10 by springs 27. A nut 31 on rod 30 allows this upper position to be adjusted.

The die set is placed in a press 32 in its open position beneath the press ram 34 with contact button 36 which is screwed into upper plate 10 beneath the center of the ram 34. A bat of molding material 37 is placed on lower die 14 and ram 34 is then lowered, pushing plate 10 with its attached die 12 downward on guide post 24. Ram 34 forces plate 10 with die 12 into the position shown in Fig. 3 in which the bat 37 has been forced into the cooperating cavities between the dies 12 and 14 to form a piece of molded ware 38. Floating plate 20 has been forced downward by the force of upper die 12 on lower die 14 and has compressed rubber cushions 22. As shown in Fig. 3, after plate 20 has compressed cushion 22 a given amount, its downward movement is stopped by metal stops 39. The ram 34 may now be continued downward as desired to compress the ware 38 to its desired thickness.

As noted above, when the die set has been closed by the ram, it is desirable that it remain closed for a definite period. Latching devices or locks 40 attached to the upper plate 10 are used to lock the die set closed so that ram 34 may be raised and so that the die set may be removed from the press 32 in the closed position. The latching devices 40 will be described in detail below.

When the die set is locked in its closed position by latching devices 40, the compressed cushions 22 press floating plate 20 upwards so that ware 38 is held under pressure between dies 12 and 14. Although rubber cushions are shown in the preferred embodiment, any suitable resilient device may be used. The pressure exerted on the ware between the dies may be fixed by the proper design of the cushion. For example, if the cushions are made of pure gum rubber, they will exert a force of about 150 pounds per square inch per inch of compression. Thus, if stop 39 is set to allow the cushion to be compressed one-half an inch and the cushions have an area of 40 square inches, the dies will be held together by a force of 3,000 pounds.

Should less pressure be desired, the ram may be raised slightly from its lowermost position, allowing the cushions to be partially decompressed.

Latching means

The latching means of the preferred embodiment are hydraulic locks 40 which are particularly suited for holding the die set closed due to their easy control and their ability to handle high pressures with accuracy of positioning. Other types of locks may be used, such as a mechanical toggle clamp. When a toggle clamp is used, a checking means such as an air or oil piston is desirable to control the upward movement of plate 10 when the die set is opened.

The hydraulic lock 40 shown in detail in Figs. 5 and 6 will now be described. The general theory of the hydraulic lock is to provide a lock which will move freely in the downward direction with the upper mounting plate 10 as it is lowered by ram 34 but which may be locked at any point of the descent to prevent an upward movement of plate 10.

A cylinder 41 of the hydraulic lock 40 is attached to upper plate 10 by bolting its lower threaded portion 42 to plate 10 by a bolt 44. A piston 45 fits within cylinder 41 and is bolted to piston rod 46 which has its lower end 47 threaded into plate 11. As cylinder 41 moves up and down with plate 10, it also moves up and down with respect to piston 45. The motion of cylinder 41 with respect to piston 45 is controlled by hydraulic fluid 48 in cylinder 41, check valve 49 on piston 45, and conduit 50 connecting the opposite ends of cylinder 41, as will be now explained.

As plate 10 moves downward under the force of ram 34, cylinder 41 moves downward on piston 45. Hydraulic fluid 48 above piston 45 flows downward through check valve 49, allowing relative motion between piston 45 and cylinder 41 so that plate 10 is easily moved downward toward plate 11.

When plate 10 has moved down far enough to form the ware 38 as shown in Fig. 3, plate 10 is locked down, allowing the die set 9 to remain closed while ram 34 is raised and the die set 9 is removed from press 32.

In order for cylinder 41 and thus plate 10 to rise on piston 45, it is necessary for hydraulic fluid 48 to pass from the lower to the upper side of piston 45. As check valve 49 prevents flow in this direction through piston 45, a conduit 50 is provided for carrying hydraulic fluid around piston 45. A valve 51 in conduit 50 controls the flow of hydraulic fluid 48 through conduit 50. When valve 51 is closed, hydraulic fluid cannot flow through conduit 50 and cylinder 41 cannot move upwardly with respect to piston 45. Thus closing valve 51 locks the plate 10 in its lowered position and prevents the force of the cushions 22 on the dies from forcing plate 10 upwardly.

The details of valve 51 are shown in Fig. 6. A valve seat 52 is provided in conduit 50 which is closed by valve stem 54. Valve stem 54 is reciprocally mounted in cylinder 55 and has a piston 56 on its outer end fitting opening 57 in cylinder 55. Piston 56 moves valve stem 54 to its inward or closed position when air is admitted through tube 60 connected to cover 59 of cylinder 55. Spring 58 compressed between the end of cylinder 55 and piston 56 returns valve stem 54 to its open position when the air pressure on piston 56 is reduced.

Tube 60 connects to an air control valve 61 (Fig. 1) to which air is supplied through connection 64 from a suitable source (not shown). Valve 61 is a well-known electrically controlled solenoid type valve. Valve 61 is connected to a voltage source through an off-on switch 62. When switch 62 is closed, the solenoid opens valve 61 and admits air through tube 60 to valve 51, closing it and thus locking the latching device 40. When switch 62 is opened, solenoid valve 61 is closed, cutting off the compressed air supply to valve 51, allowing it and thus die set 9 to open. Switch 62 is shown resting on the press in a position convenient for the press operator, however it is left unfastened for movement with the die set when the die set is removed from the press. If desired, switch 62 may be mounted on die set 9. Air tube 60 connects to all latching devices 40 to allow them to be controlled simultaneously by switch 62.

Auxiliary cylinder 70 on latching devices 40 connects to cylinder 41 by a conduit 71. Spring 75 forces piston 74 against the fluid 72 in cylinder 70 to keep the fluid under pressure and to thus force it into cylinder 41 to compensate for changes in the volumetric displacement of piston rod 46 and for hydraulic fluid leakage.

Operation

The latching die set 9 may be used with any type of press which will exert enough force to close the two dies together to form the ware. The die set 9 is particularly suited to fast-acting mechanical presses which are used to turn out moldings at high rates. A present disadvantage of the fast-acting presses is that the dies do not remain closed under pressure long enough to allow the molding material to reach stress equilibrium. Pressure ridges remain in the finished ware in this case. By using the latching die set 9, the die may be removed from the press in its locked condition, allowing the molding material to reach equilibrium after the die set has been removed from the press. The rapid operation of the mechanical press thus may be taken advantage of, since the dies need not be kept in the press during the waiting interval.

Die set 9 is first placed in the press 32 by a conveyor or any other suitable means. When placed in press 32, the die set 9 is in its open position with plate 10 in its uppermost position. Plug 63 is placed in solenoid valve 61 to connect the valve 61 through switch 62 to a voltage source and the air supply is connected to valve 61 at coupling 64.

A bat of molding material 37 is next placed in position on lower die 14. Ram 34 of press 32 is now lowered so that it forces button 36 and plate 10 together with attached upper die 12 downward to force bat 37 into the cavity between the upper and lower dies to form the piece of ware 38. Cylinders 41 of hydraulic latching devices 40 have now moved downward on pistons 45. The cylinders 41 are next locked in this position to hold the die set closed.

The operator locks the latching devices 40 down by closing switch 62 to open solenoid valve 61 to admit air to the latching device control valves 51. As noted above, valves 51 are closed by the air pressure to shut off conduit 50 in the latching device and to thus prevent cylinder 41 from rising with respect to piston 45.

Ram 34 is now raised clear of button 36 and die set 9 is removed from press 32. The air and electric supplies to solenoid valve 61 are left connected to allow the operator to maintain control of the die set 9. The air hose and electric lead wires connected to the valve 61 and the switch 62 are made sufficiently long to allow the die set 9 to be moved from the press 32 to any desired location. When the die set 9 has remained closed for a sufficient time to allow the molded ware to reach stress equilibrium, switch 62 is opened, removing the air pressure from valve 51 of the latching means 40. This opens conduit 50, allowing hydraulic fluid to flow upwardly to the top side of piston 45 and allowing the plate 10 to rise under the force of springs 27. Just prior to the opening of the die set compressed air is admitted to conduit 66 to create a pressure on the lower surface of the ware to force it off die 14. The ware will then remain attached to upper die 12 as it rises up. When it is desired to remove the ware from die 12, compressed air is admitted to conduit 65, blowing the ware downward off die 12 to the operator's hand or to a suitable ware-catching device. If desired, the order of applying air to the die set may be reversed so that the plate is blown from top die 12 first and then from bottom die 14.

For the most efficient use of the die set it is preferably used with an automatic feeding device. Thus an indexing type of table feed may be used to present a plurality of dies one at a time to the press. A series of other stations suitably located around the table automatically perform the other necessary steps. For example, at a first station with the die set open a bat of molding material is placed on lower die 14. The die set is next stepped into the press and is closed and locked. The die set is now stepped clear of the press and it passes through a suitable number of stations to provide for the desired waiting period while the ware reaches stress equilibrium. The die set next is stepped to a discharge station where air is applied to the lower die while the latching device is released. The formed ware is lifted by the upper die, and after a suitable ware-catching device is moved into place, the ware is blown to it from the upper die. Air is now applied to both upper and lower dies to clear them of moisture forced into them by the molding material. One die preferably is provided on the table for each station so that each time the table is stepped, a piece of ware is completed and discharged.

It will be seen that the present invention provides an improved means of molding ware. By the use of the means of the invention, the time-consuming portion of the molding process occurs after the die set has been removed from the molding presses. Thus the output of the presses may be increased and the investment in the expensive press equipment accordingly reduced.

A latching die set has been disclosed which is compact and efficient and which may be both easily moved into position in the presses and controlled by the press operator in and out of the press. The latching die set not only may be locked to allow its removal from the press in a closed position but it also has an integral pressure maintaining device whereby the molded ware is kept under pressure even after the die set has been removed from the press.

As various changes may be made in the above embodiment without departing from the spirit of the invention, it is to be understood that all matter herein set forth is to be interpreted as illustrative and not in a limiting sense.

Having thus described our invention, we claim:

1. A latching means for a die set comprising a pair of mounting plates adapted to mount cooperable dies in facing fashion, first resilient means connecting said plates to hold said plates in a normally open position and allowing them to be forced together to close the dies, a guide bar connected to one of said plates and passing through a bearing in the other plate to keep said plates in alignment while being forced together, second resilient means adapted for interposition between one die and its mounting plate and adapted to be compressed when the dies are forced together, and removable locking means for connecting said plates together to hold the dies in a closed position under the pressure of the compressed second resilient means.

2. A latching means for a die set comprising a bottom plate, a top die mounting plate resiliently connected to said bottom plate for reciprocal motion toward and away from it and adapted to mount a first die on its lower surface, a bottom die mounting plate resiliently mounted on said bottom plate and adapted to mount a second die on its upper surface complementary to said first die, guide means slidably connecting said die mounting plates whereby when said top die mounting plate is moved toward said bottom die mounting plate the complementary dies meet in registry and said resilient support for said bottom die mounting plate is compressed, and a lock adapted to removably retain said top die mounting plate in a position adjacent said bottom die mounting plate to hold said dies in a closed position with the resilient mounting means for said bottom die mounting plate compressed whereby the dies are held closed under pressure.

3. A latching means for a die set comprising a lower mounting plate, an upper mounting plate adapted to support a first die on its lower surface, a resilient means between said plates to hold them in a normally spaced relationship, a stop means to limit the distance said resilient means holds said plates apart, a floating plate supported above said lower mounting plate by a resilient mounting and adapted to support a second die complementary to said first die, stop means on said lower mounting plate spaced from said floating plate whereby when said upper mounting plate is forced downward toward said lower mounting plate the dies are moved together and said floating plate is moved downwardly against said stops compressing said resilient mounting between said floating plate and said lower mounting plate, and a latching means to lock said upper plate in its downward position whereby said resilient means forces upward against said floating plate and forces the second die against the first die.

4. A latching die set comprising a lower plate, an upper mounting plate with a first die mounted on its lower surface, a first resilient means between said plates to hold them in a normally spaced relationship, a stop means to limit the upward movement of said upper plate by said resilient means, a floating plate supported above said lower plate by a second resilient means, a second die complementary to said first die mounted on said floating plate, a guide post for said upper mounting plate and said floating plate to hold said dies in alignment when said upper mounting plate is moved downwardly so that the dies close on a bat of molding material, a stop means on said lower plate beneath and spaced from said floating plate to limit the downward motion of said floating plate as it compresses said second resilient means, and a latching means to hold said upper plate in a lowered position with said dies in a closed position and said second resilient means compressed to force said floating plate upwardly to keep the dies closed under a relatively constant pressure on the molding material.

5. The latching means as claimed in claim 1 in which said locking means comprises a hydraulic lock.

6. The latching means as claimed in claim 1 in which said second resilient means comprises resilient rubber cushions.

7. The latching means as claimed in claim 2 in which said lock comprises a hydraulic lock.

References Cited in the file of this patent

UNITED STATES PATENTS

| 1,525,629 | Thompson | Feb. 10, 1925 |
| 1,965,732 | Bisterfield | July 10, 1934 |
| 2,027,165 | Grubman | Jan. 7, 1936 |
| 2,055,742 | Burke | Sept. 29, 1936 |
| 2,334,078 | Feinberg | Nov. 9, 1943 |
| 2,584,110 | Blackburn et al. | Feb. 5, 1952 |
| 2,775,790 | Lappin et al. | Jan. 1, 1957 |

FOREIGN PATENTS

| 128,866 | Sweden | July 25, 1950 |